United States Patent
Tang et al.

(10) Patent No.: US 10,084,558 B2
(45) Date of Patent: Sep. 25, 2018

(54) CROSS-DOMAIN CLOCK SYNCHRONIZATION METHOD, DEVICE AND SYSTEM AND COMPUTER STORAGE MEDIUM

(71) Applicant: ZTE Corporation, Shenzhen, Guangdong (CN)

(72) Inventors: Kexin Tang, Shenzhen (CN); Xihua Fu, Shenzhen (CN); Junhui Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/523,086

(22) PCT Filed: Feb. 3, 2015

(86) PCT No.: PCT/CN2015/072151
§ 371 (c)(1),
(2) Date: Apr. 28, 2017

(87) PCT Pub. No.: WO2016/065763
PCT Pub. Date: May 6, 2016

(65) Prior Publication Data
US 2017/0331574 A1    Nov. 16, 2017

(30) Foreign Application Priority Data
Oct. 28, 2014  (CN) .......................... 2014 1 0593617

(51) Int. Cl.
*H04J 3/06*      (2006.01)
*H04L 12/403*    (2006.01)
*H04L 12/915*    (2013.01)

(52) U.S. Cl.
CPC .......... *H04J 3/0638* (2013.01); *H04J 3/0647* (2013.01); *H04L 12/403* (2013.01); *H04L 47/785* (2013.01)

(58) Field of Classification Search
CPC ....... H04L 7/0331; H04L 7/042; H03L 7/091; H03L 7/093; H03L 7/0991; H03L 7/0974
See application file for complete search history.

(56) References Cited

U.S. PATENT DOCUMENTS 8,885,463 B1 * 11/2014 Medved .................. H04L 45/50
                                                370/228
2010/0208733 A1 * 8/2010 Zhao ..................... H04L 12/185
                                                370/390

(Continued)

FOREIGN PATENT DOCUMENTS

CN    101309122 A    11/2008
CN    101471853 A    7/2009

(Continued)

OTHER PUBLICATIONS

"PCE-based Computation Procedure to Compute Shortest Constrained P2MP", May 2013, Q.Zhao, D. Dhody, Z. Ali, D. King, R. Caselias, Inter-domain Traffic Engineering Label Switched Paths;draft-ietf-pce-pcep-inter-domain-p2mp-procedures-04.txt, PCEP P2MP Procedures, 22 pgs.

(Continued)

*Primary Examiner* — Freshteh N Aghdam
(74) *Attorney, Agent, or Firm* — Cooper Legal Group, LLC

(57) ABSTRACT

A cross-domain clock synchronization method, device and system and a computer storage medium, which are applied to a cross-domain synchronization network. A Path Calculate Element (PCE) exchanges a clock synchronization type with a controller participating in clock synchronization path calculation to match the clock synchronization type sup- (Continued)

ported by the PCE and the controller; the PCE acquires physical topological information of the cross-domain synchronization network; the PCE acquires synchronization information of synchronization nodes of the cross-domain synchronization network and/or hop number information between the synchronization nodes; the PCE calculates a clock synchronization path of the cross-domain synchronization network according to the physical topological information as well as the synchronization information and/or the hop number information; and the PCE sends the clock synchronization path to the controller according to the physical topological information to enable the controller to send a clock synchronization instruction to synchronization nodes on the clock synchronization path.

20 Claims, 8 Drawing Sheets

(56) References Cited

U.S. PATENT DOCUMENTS

| | | | | |
|---|---|---|---|---|
| 2010/0265943 | A1* | 10/2010 | Dong | H04L 45/04 370/389 |
| 2012/0226824 | A1* | 9/2012 | Trnkus | H04W 16/18 709/250 |
| 2015/0222557 | A1* | 8/2015 | Bhattacharya | H04L 47/32 370/237 |
| 2016/0374041 | A1* | 12/2016 | Zhang | H04B 7/269 |
| 2017/0272315 | A1* | 9/2017 | Wetterwald | H04L 41/04 |

FOREIGN PATENT DOCUMENTS

| | | |
|---|---|---|
| CN | 102904662 A | 1/2013 |
| CN | 103957159 A | 7/2014 |
| WO | 2011044925 A1 | 4/2011 |

OTHER PUBLICATIONS

"Extensions to the Path Computation Element Communication Protocol (PCEP) for Point-to-Multipoint Traffic Engineering Label Switched Paths", Sep. 2010, Q. Zhao, D. King, F. Verhaeghe, T. Takenda, Z. Ali and J. Meuric, IETF;Standard, Internet Society (ISOC) 4, Rue Des Falai Ses CH-I,21, 34 pgs.
"Path Computation Element (PCE) Protocol Extension for Stateful PCE Usage in GMPLS Networks", Oct. 2012, Xian Zhang, Young Lee, R. Caselias, draft-zhang-pce-pcep-stateful-pce-gmpls-01.txt, Internet Engineering Task Force, Network Working Group, 16 pgs.
"Application-oriented Stateful PCE Architecture and Use-cases for Transport Networks", Feb. 2014, Young Lee, Xian Zhang, Haomian Zheng G. Zhang, draft-lee-pce-app-oriented-arch-01.txt, Internet Engineering Task Force, IETF; Internet Society (I SOC), PCE Working Group, Internet Draft, 12 pgs.
"Applicability of Stateful Path Computation Element (PCE)", Oct. 2012, Fatai Zhang, Xian Zhang, Young Lee, R. Caselias, Oscar Gonzales De Dics, draft-zhang-pce-stateful-pce-app-02.txt, Internet Eningeering Task Force, IETF; Internet Society, (I SOC), Network Working Group, Internet Draft, 24 pgs.
"Transporting PTP messages (1588) over MPLS Networks", Jan. 2011, S. Savari, A Oren, L Martini, M. Pohatia, P. Roberts, draft-ietf-tictoc-1588overmpls-00.txt, Internet Engineering Task Force, TICTOC Working Group, Internet Draft, 36 pgs.
Supplementary European Search Report in European application No. 15854421.3, dated Nov. 8, 2017, 7 pgs.
International Search Report in international application No. PCT/CN2015/072151, dated Jul. 17, 2015, 3 pgs.
English Translation of the Written Opinion of the International Search Authority in international application No. PCT/CN2015/072151, dated Jul. 17, 2015, 10 pgs.
"Path Computation Element (PCE) Communication Protocol (PCEP)" Mar. 2009, JP Vasseur and JL Leroux, Network Working Group, 87 pgs.
"Research on PCE-Based ASON Routing Technology", Apr. 2009, Huang Lili, Li Xiadong, Ye Yunfeng and Zhao Jijun, Study on Optical Communications, No. 2, 5 pgs.

* cited by examiner

Fig. 15
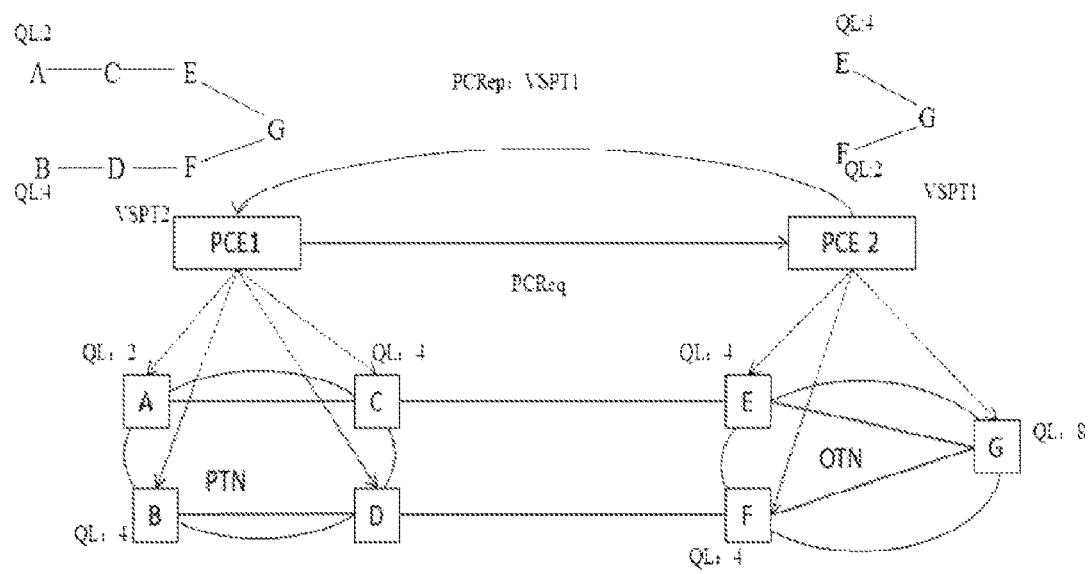
Fig. 16
A ⟶ C ⟶ E ⟶ G
Fig. 17
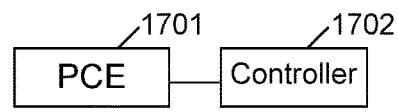

CROSS-DOMAIN CLOCK SYNCHRONIZATION METHOD, DEVICE AND SYSTEM AND COMPUTER STORAGE MEDIUM

TECHNICAL FIELD

The disclosure relates to communication technologies, and more particularly to a cross-domain clock synchronization method, device and system and a computer storage medium.

BACKGROUND

Clock synchronization in a communication network is a very important technology. Accuracy and timeliness of clock synchronization are directly related to quality of services of the whole network. There are two types of clock synchronization in the current communication network, i.e., time synchronization (also referred to as phase synchronization) and frequency synchronization. Time synchronization requires a same absolute time for individual points; and frequency synchronization keeps a same frequency for the individual points, which may be of any phase. Since clock equipment, in a process of tracking a clock source, only needs to regulate a frequency of a local clock signal to be the same as a frequency of the clock source without considering the phase, there is tracked phase accumulation.

In the conventional communication networks, there are relatively undiversified network types (for example, only one type of networks are usually included), the scale of a single network is not large, and the number of network nodes and the number of hops between the nodes are small, so that it is relatively easy to implement clock synchronization. For the current communication networks, the structures of thereof become increasingly complex, and there are more and more types of transport networks, for example, packet switched networks such as Internet Protocol (IP)/Multi-Protocol Label Switching (MPLS) and optical networks such as an Optical Transport Network (OTN) and a Synchronous Digital Hierarchy (SDH) network, the scale of a network is also rapidly extended, and a single network is developed from a single-type network to a multiple-type network, for example, a single network formed by hybrid networking of a Packet Transport Network (PTN) and an OTN. Moreover, a single network includes more and more network nodes, and topological relationships between the nodes gradually become complex.

Currently, in a multiple-type network, implementation of a cross-domain clock synchronization method relies on manual configuration. The conventional communication network which is relatively simple may be manually arranged to meet the network clock synchronization requirement. However, as the current network becomes increasingly complex, adoption of conventional manual configuration for implementing clock synchronization may cause tediousness of maintenance work. Moreover, the current network changes frequently, so that it is very difficult to implement clock synchronization of the current large network system by solely adopting the manual configuration manner.

SUMMARY

In order to solve the existed technical problem, a cross-domain clock synchronization method, device and system and a computer storage medium are provided in embodiments of the disclosure.

An embodiment of the disclosure provides a cross-domain clock synchronization method, which may be applied to a cross-domain synchronization network, the method including that:

a Path Calculate Element (PCE) exchanges a clock synchronization type with a controller participating in clock synchronization path calculation to match clock synchronization types supported by the PCE and the controller;

the PCE acquires physical topological information of the cross-domain synchronization network;

the PCE acquires synchronization information of synchronization nodes of the cross-domain synchronization network and/or hop number information between the synchronization nodes;

the PCE calculates a clock synchronization path of the cross-domain synchronization network according to the physical topological information as well as the synchronization information and/or the hop number information; and the PCE sends the clock synchronization path to the controller according to the physical topological information to enable the controller to send a clock synchronization instruction to synchronization nodes on the clock synchronization path.

The step that the PCE exchanges the clock synchronization type with the controller participating in clock synchronization path calculation may include that:

the PCE exchanges the clock synchronization type with the controller participating in clock synchronization path calculation through an SYN Type in an extended SYN Type Length Value (TLV) in an OPEN message.

The step that the PCE acquires the physical topological information of the cross-domain synchronization network may include that:

the PCE acquires a physical topology of the cross-domain synchronization network through the controller or through a network management system.

The step that the PCE acquires the synchronization information of the synchronization nodes of the cross-domain synchronization network and/or the hop number information between the synchronization nodes may include that:

the PCE acquires the synchronization information from the controller through an added SYN-INFORMATION object in an extended PCReq message, or the PCE acquires the synchronization information through the network management system; and the PCE acquires the hop number information through the network management system.

The step that the PCE calculates the clock synchronization path of the cross-domain synchronization network according to the physical topological information as well as the synchronization information and/or the hop number information may include that:

when a sequence of synchronization subnetworks through which the clock synchronization path passes is known, the clock synchronization path is calculated by adopting a Backward-Recursive PCE-Base Computation (BRPC) method.

The step that the PCE calculates the clock synchronization path of the cross-domain synchronization network according to the physical topological information as well as the synchronization information and/or the hop number information may include that:

when the sequence of the synchronization subnetworks through which the clock synchronization path passes is unknown, the clock synchronization path is calculated by adopting a Hierarchy-PCE (H-PCE) method.

The synchronization information may include clock Quality Level (QL) information and port priority information; and the step that the PCE calculates the clock synchronization path of the cross-domain synchronization network according to the physical topological information as well as the synchronization information and/or the hop number information may include that:

when only the clock QL information is acquired, a node with a highest QL is selected as a clock source output node; or, when only the port priority information is acquired, a node with a higher-priority port is selected as the clock source output node; or, when only the hop number information is acquired, a node being a relatively smaller number of hops away from a current node is selected as the clock source output node.

The synchronization information may include the clock QL information and the port priority information; and the step that the PCE calculates the clock synchronization path of the cross-domain synchronization network according to the physical topological information as well as the synchronization information and/or the hop number information may include that:

when the clock QL information, the port priority information and the hop number information are acquired, preferably selecting a node with a highest QL as a clock source output node; when there are multiple nodes with the highest QL, selecting a node with a higher-priority port from nodes with the highest QL as the clock source output node; and when there are still multiple nodes with the higher-priority ports, selecting a node being a relatively smaller number of hops away from the current node from nodes with the higher-priority ports as the clock source output node.

The step that the PCE sends the clock synchronization path to the controller according to the physical topological information may include that:

the PCE sends the clock synchronization path to the controller through an extended PCRep message according to the physical topological information.

Another embodiment of the disclosure provides a cross-domain clock synchronization system, which may be applied to a cross-domain synchronization network. The system includes a PCE and a controller participating in clock synchronization path calculation.

The PCE may be arranged to exchange a clock synchronization type with the controller to match clock synchronization types supported by the PCE and the controller, acquire physical topological information of the cross-domain synchronization network, acquire synchronization information of synchronization nodes of the cross-domain synchronization network and/or hop number information between the synchronization nodes, calculate a clock synchronization path of the cross-domain synchronization network according to the physical topological information as well as the synchronization information and/or the hop number information between the synchronization nodes, and send the clock synchronization path to the controller according to the physical topological information.

The controller may be arranged to send a clock synchronization instruction to synchronization nodes on the clock synchronization path.

The PCE may be arranged to exchange the clock synchronization type with the controller through an SYN Type in an extended SYN TLV in an OPEN message.

The PCE may be arranged to acquire the synchronization information from the controller through an added SYN-INFORMATION object in an extended PCReq message, or acquire the synchronization information through a network management system.

The PCE may be arranged to send the clock synchronization path to the controller through an extended PCRep message according to the physical topological information.

A further embodiment of the disclosure provides a PCE, which may be applied to a cross-domain synchronization network. The PCE includes a processing module, a first acquisition module, a second acquisition module, a calculation module and a sending module.

The processing module is arranged to exchange a clock synchronization type with a controller participating in clock synchronization path calculation to match clock synchronization types supported by the PCE and the controller.

The first acquisition module is arranged to acquire physical topological information of the cross-domain synchronization network.

The second acquisition module is arranged to acquire synchronization information of synchronization nodes of the cross-domain synchronization network and/or hop number information between the synchronization nodes.

The calculation module is arranged to calculate a clock synchronization path of the cross-domain synchronization network according to the physical topological information as well as the synchronization information and/or the hop number information.

The sending module is arranged to send the clock synchronization path to the controller according to the physical topological information to enable the controller to send a clock synchronization instruction to synchronization nodes on the clock synchronization path.

The processing module may be arranged to exchange the clock synchronization type with the controller participating in clock synchronization path calculation through an SYN Type in an extended SYN TLV in an OPEN message.

The second acquisition module may be arranged to acquire the synchronization information from the controller through an added SYN-INFORMATION object in an extended PCReq message, or acquire, by the PCE, the synchronization information through a network management system.

The sending module may be arranged to send the clock synchronization path to the controller through an extended PCRep message according to the physical topological information.

A further embodiment of the disclosure provides a controller, which may be applied to a cross-domain synchronization network. The controller includes a processing module, a receiving module and a sending module.

The processing module is arranged to exchange a clock synchronization type with a PCE to match clock synchronization types supported by the controller and the PCE.

The receiving module is arranged to receive a clock synchronization path sent by the PCE.

The sending module is arranged to send a clock synchronization instruction to synchronization nodes on the clock synchronization path.

A further embodiment of the disclosure provides a computer storage medium, which may include a set of instructions, the instructions, when being executed, cause at least one processor to execute the abovementioned cross-domain clock synchronization method.

From the above, it can be seen that in the technical solutions of the embodiments of the disclosure, the PCE exchanges the clock synchronization type with the controller participating in clock synchronization path calculation to match the clock synchronization type supported by the PCE and the controller; the PCE acquires the physical topological information of the cross-domain synchronization network; the PCE acquires the synchronization information of the synchronization nodes of the cross-domain synchronization network and/or the hop number information between the synchronization nodes; the PCE calculates the clock synchronization path of the cross-domain synchronization network according to the physical topological information as well as the synchronization information and/or the hop number information; the PCE sends the clock synchronization path to the controller according to the physical topological information; and the controller sends the clock synchronization instruction to the synchronization nodes on the clock synchronization path.

According to the embodiments of the disclosure, the clock synchronization path of the cross-domain synchronization network formed by multiple synchronization subnetworks may be automatically calculated, so that manual configuration is not required, synchronization performance of the whole network is effectively improved, and clock synchronization efficiency of the cross-domain synchronization network is improved.

BRIEF DESCRIPTION OF THE DRAWINGS

In the drawings (which may not be drawn to scale), similar drawing reference signs may describe similar parts in different drawings. Similar drawing reference signs with different letter suffixes may represent different examples of similar parts. The drawings substantially show each embodiment discussed in the disclosure not limitedly but exemplarily.

FIG. 15 is a schematic diagram of calculating a synchronization path of a cross-domain synchronization network by BRPC according to an embodiment of the disclosure;

FIG. 16 is a schematic diagram of a synchronization path crossing PTN and OTN domains calculated by a PCE according to an embodiment of the disclosure;

FIG. 17 is a structure diagram of an embodiment of a cross-domain clock synchronization system according to the disclosure;

DETAILED DESCRIPTION

Figure 1:
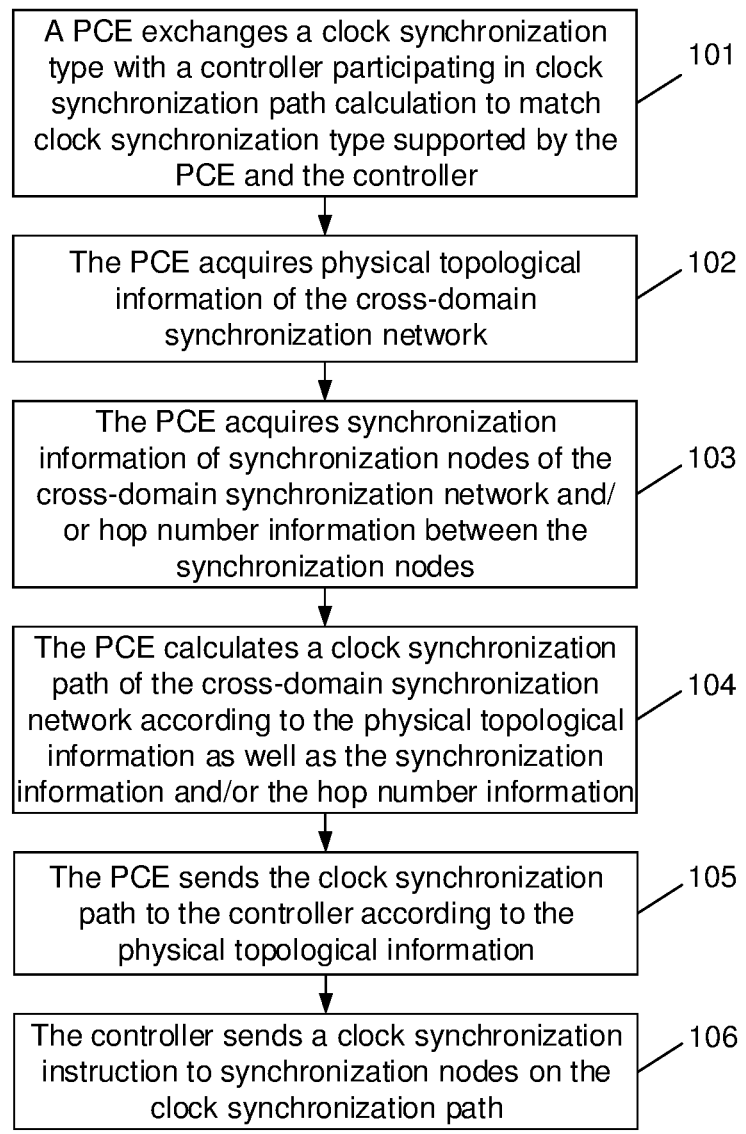
FIG. 1 is a flowchart of an embodiment of a cross-domain clock synchronization method according to the disclosure.

The disclosure provides an embodiment of a cross-domain clock synchronization method, which is applied to a cross-domain synchronization network, the cross-domain synchronization network at least including two synchronization subnetworks. As shown in FIG. 1, the method includes the following steps.

In step 101, a PCE exchanges a clock synchronization type with a controller participating in clock synchronization path calculation to match clock synchronization types supported by the PCE and the controller.

Specifically, the PCE may exchange the clock synchronization type with the controller participating in clock synchronization path calculation through an SYN Type in an extended SYN TLV in an OPEN message, and of course, another manner may also be adopted. The embodiment does not limit the manner for exchanging clock synchronization type information.

In step 102, the PCE acquires physical topological information of the cross-domain synchronization network.

Specifically, the PCE acquires a physical topology of the cross-domain synchronization network through the controller or through a network management system.

In step 103, the PCE acquires synchronization information of synchronization nodes of the cross-domain synchronization network and/or hop number information between the synchronization nodes.

Specifically, the synchronization information includes: clock QL information, port priority information and synchronization capability information. The synchronization capability information is information capable of indicating whether the synchronization nodes have a capability of supporting frequency synchronization and/or time synchronization or not, and furthermore, the synchronization capability information may indicate whether ports of the synchronization nodes have the capability of supporting frequency synchronization and/or time synchronization or not.

In practical application, the PCE may acquire the synchronization information from the controller through an added SYN-INFORMATION object in an extended PCReq message, or the PCE may acquire the synchronization information through the network management system.

The PCE may acquire the hop number information through the network management system.

In step 104, the PCE calculates a clock synchronization path of the cross-domain synchronization network according to the physical topological information as well as the synchronization information and/or the hop number information.

Specifically, when a sequence of synchronization subnetworks through which the clock synchronization path passes is known, the clock synchronization path is calculated by adopting a BRPC method.

Calculation of the clock synchronization path by adopting the BRPC method includes the following steps.

A PCE of a destination synchronization subnetwork calculates a Virtual Shortest Path Tree (VSPT) of the current domain, the VSPT including optimal synchronization paths from all boundary nodes of the current domain to a destination node.

The VSPT is transmitted to a PCE of a previous synchronization subnetwork in the sequence.

The PCE of the previous synchronization subnetwork calculates a VSPT of the current domain according to the received VSPT, the VSPT including optimal synchronization paths from all boundary nodes of the current domain to the destination node.

The calculated VSPT is transmitted to a PCE of a previous synchronization subnetwork in the sequence until a PCE of a first synchronization subnetwork receives a VS PT.

The PCE of the first synchronization subnetwork calculates an optimal clock synchronization path according to the received VSPT.

In addition, when the sequence of the synchronization subnetworks through which the clock synchronization path passes is unknown, the clock synchronization path is calculated by adopting an H-PCE method.

Calculation of the clock synchronization path by adopting the H-PCE method includes the following steps.

The PCE calculates an optimal inter-domain clock synchronization path, and the PCE splices the optimal inter-domain clock synchronization path and an optimal intra-domain clock synchronization path calculated by the controller to obtain an optimal clock synchronization path.

The synchronization information includes the clock QL information and the port priority information.

In practical application, when only the clock QL information is acquired, the node with a highest QL is selected as a clock source output node.

When only the port priority information is acquired, the node with a high-priority port is selected as the clock source output node.

When only the hop number information is acquired, the node being a relatively small number of hops away from the current node is selected as the clock source output node.

It is to be noted here that among the clock QL information, the port priority information and the hop number information, priority of the clock QL information takes the first place, priority of the port priority information comes second, and priority of the hop number information is the lowest. When the clock QL information, the port priority information and the hop number information are acquired, the node with the highest QL is preferably selected as the clock source output node; when there are multiple nodes with the highest QL, the node with the higher-priority port is selected from nodes with the highest QL as the clock source output node; and when there are still multiple nodes with the higher-priority ports, the node being a relatively small number of hops away from the current node is selected from nodes with the higher-priority ports as the clock source output node.

In step 105, the PCE sends the clock synchronization path to the controller according to the physical topological information.

Specifically, the PCE sends the clock synchronization path to the controller through an extended PCRep message according to the physical topological information.

In step 106, the controller sends a clock synchronization instruction to synchronization nodes on the clock synchronization path.

From the above description, it can be seen that the PCE is required to execute the following steps 1 to 5.

In step 1, the PCE exchanges the clock synchronization type with the controller participating in clock synchronization path calculation to match the clock synchronization type supported by the PCE and the controller.

In step 2, the PCE acquires the physical topological information of the cross-domain synchronization network.

In step 3, the PCE acquires the synchronization information of the synchronization nodes of the cross-domain synchronization network and/or the hop number information between the synchronization nodes.

In step 4, the PCE calculates the clock synchronization path of the cross-domain synchronization network according to the physical topological information as well as the synchronization information and/or the hop number information.

In step 5, the PCE sends the clock synchronization path to the controller according to the physical topological information, to enable the controller to send the clock synchronization instruction to the synchronization nodes on the clock synchronization path.

For convenience of understanding, the technical solution of the embodiment of the disclosure will be further described below.

A Request For Comment (RFC) 5440 of the Internet Engineering Task Force (IETF) defines a Path Calculate Element Protocol (PCEP) for communication between a PCE and a Path Calculate Client (PCC).

According to the embodiment of the disclosure, the PCEP is extended, so that the PCE may be applied to a cross-domain synchronization network formed by multiple synchronization networks to implement clock synchronization in a cross-domain hybrid networking scenario. Specifically, the PCEP is extended as follows in the embodiment of the disclosure.

Figure 2:
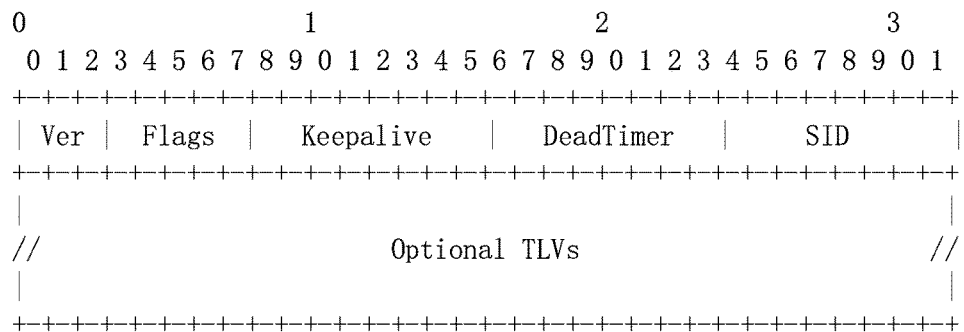
FIG. 2 is a schematic diagram of an OPEN object format according to an embodiment of the disclosure.
Figure 3:
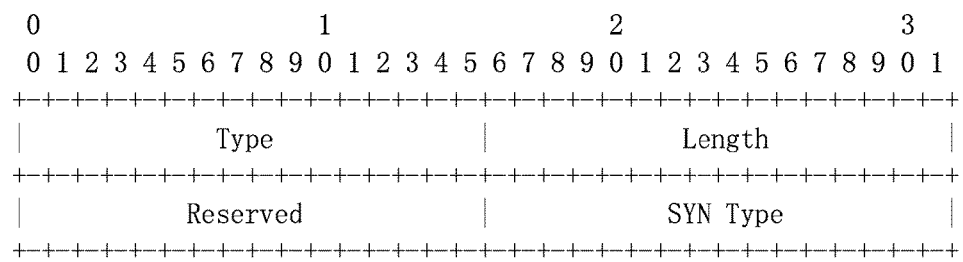
FIG. 3 is a schematic diagram of an extended SYN TLV format according to an embodiment of the disclosure.

An OPEN object is extended: the OPEN object defined by the RFC 5440 is shown in FIG. 2, in which an Optional TLVs part describes features of the PCC or the PCE. In the embodiment of the disclosure, the OPEN object is extended to include a new Optional TLV-SYN TLV, as shown in FIG. 3, of which fields and meanings thereof are given as follows respectively: Type field, representing a type of the Optional TLV; Length field, representing a length of the Optional TLV in bytes, and the length value is 4 bytes here; Reserved field, representing a reserved byte part which is currently not defined; and SYN Type field, representing a clock synchronization type(s) supported by the PCE, and three values are currently defined: 0, 1 and 2, which represent that the PCE supports a time synchronization network, supports a frequency synchronization network and supports both the time synchronization network and the frequency synchronization network respectively.

Before a PCEP session is established between the PCE and a controller, an OPEN message is exchanged at first, and the new SYN TLV is carried in the extended OPEN object in the embodiment of the disclosure, so that the PCE may know about a clock synchronization type requested for calculation, and the controller may know about a clock synchronization type supported to be calculated by the PCE. Specifically, the clock synchronization type is carried through the SYN Type field in the SYN TLV in the OPEN message.

Figure 4:
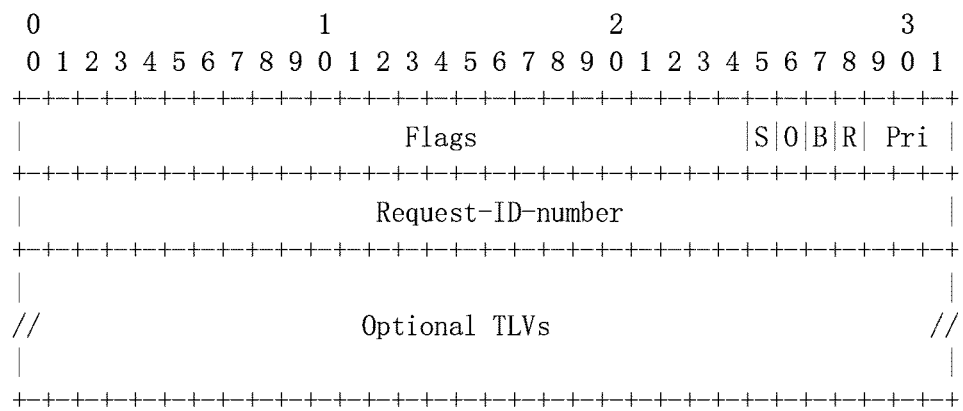
FIG. 4 is a schematic diagram of an extended Rapid Prototype (RP) object format according to an embodiment of the disclosure.

An RP object of a PCReq message is extended. A flag, namely S flag, is added to an original Flags field of the RP object, and represents that a clock synchronization path is requested to be calculated this time. A format of the extended RP object is shown in FIG. 4. Meanings of original fields of the RP object are the same as those defined in the RFC 5400, and will not be elaborated herein. When the RP object includes the S flag, it is indicated that the clock synchronization path is requested.

The PCReq message is extended. An added SYN-INFORMATION object carries parameters required by clock synchronization calculation:

```
<PCReq Message>::=<Common Header>
    [<svec-list>]
    <request-list>
where <svec-list>::=<SVEC>[<svec-list>]
    <request-list>::=<request>[<request-list>]
    <request>::=<RP>
        <END-POINTS>
        [<SYN-INFORMATION>
        [<LSPA>]
        [<BANDWIDTH>]
        [<metric-list>]
        [<RRO>[<BANDWIDTH>]]
        [<IRO>]
        [<LOAD-BALANCING>]
```

Figure 5:
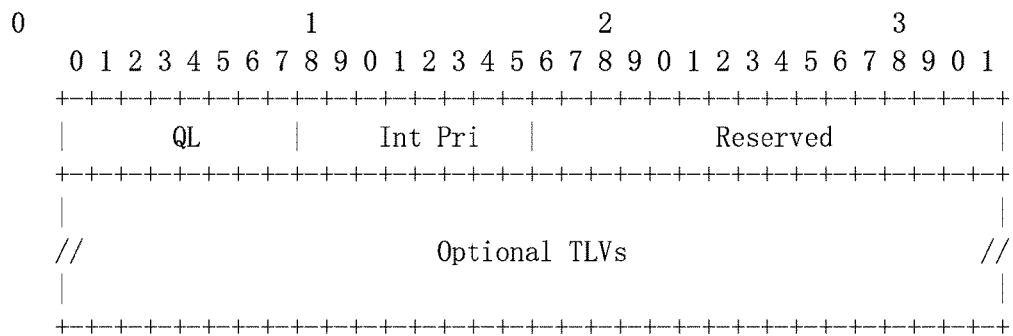
FIG. 5 is a schematic diagram of an added SYN-INFORMATION object format according to an embodiment of the disclosure.

The added SYN-INFORMATION object is shown in FIG. 5, and meaning of each defined field is given as follows respectively:

QL: clock QL information, i.e. a clock QL of a domain edge node of a synchronization subnetwork. The QLs are given as follows from high to low: QL=0000=0 represents that synchronization quality is unknown, QL=0010=2 represents a first-level clock, QL=0100=4 represents a second-level clock, QL=10000=9 represents a third-level clock, QL=1011=11 represents an SDH equipment clock and QL=1111=15 represents being not applicable, that is, it may not be applied as a synchronization clock;

Int Pri: port priority information, i.e. a priority of a port, connected with a cross-domain link, of each node, which is represented by an Arabic numeral. The priority is higher if the numeral is smaller, and a currently defined 8-bit priority is started from numeral 1, that is, the priority is highest when the priority is 1;

Reserved: a reserved field, which is currently not defined; and

Optional TLVs: an Optional TLV, which is currently not defined.

Figure 6:
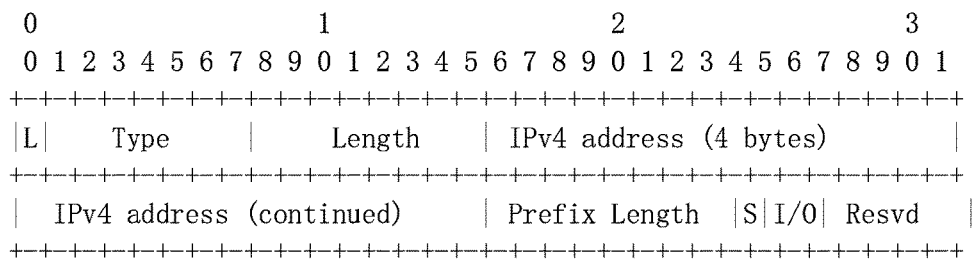
FIG. 6 is a schematic diagram of an Internet Protocol version 4 (IPv4) prefix sub-object format of an extended Explicit Route Object (ERO) according to an embodiment of the disclosure.
Figure 7:
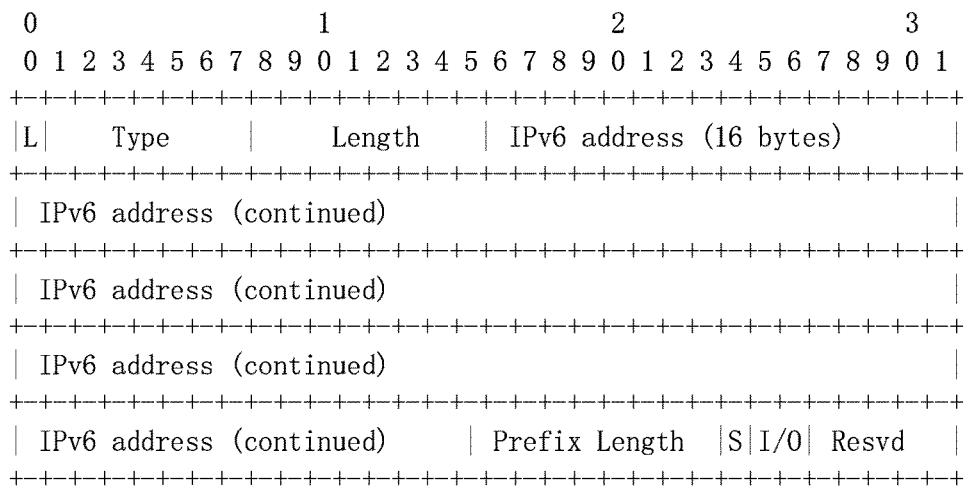
FIG. 7 is a schematic diagram of an Internet Protocol version 6 (IPv6) prefix sub-object format of an extended Explicit Route Object (ERO) according to an embodiment of the disclosure.

For IPv4 prefix and IPv6 prefix sub-objects of an ERO object of an extended PCRep message are extended, two fields are added to the two sub-objects: S and Input/Output (I/O), and meanings of the fields are given as follows respectively: S represents that a clock synchronization path calculation result is returned as a path calculation response of this time; and I/O represents that the current node serves as an I/O port for clock synchronization. Two I/O values are currently defined: 1 and 0. When I/O is 1, it is indicated that the current node serves as input of clock synchronization, and obtains clock synchronization from a port of a destination address in the message; and when the value of I/O is 0, it is indicated that the current node serves as output of clock synchronization, and synchronizes a clock source signal to the port of the destination address in the message. Formats of the IPv4 prefix and IPv6 prefix sub-objects of the extended ERO object are shown in FIG. 6 and FIG. 7 respectively. Meanings of original fields of the IPv4 prefix and IPv6 prefix sub-objects of the ERO object are the same as those defined in the RFC 5440, and will not be elaborated herein.

The technical solution of the disclosure will be further elaborated below with reference to the drawings and specific embodiments.

First Embodiment

The embodiment is intended for a condition that a domain sequence (i.e. a sequence of synchronization subnetworks) crossing PTN and OTN domains is unknown.

Figure 8:
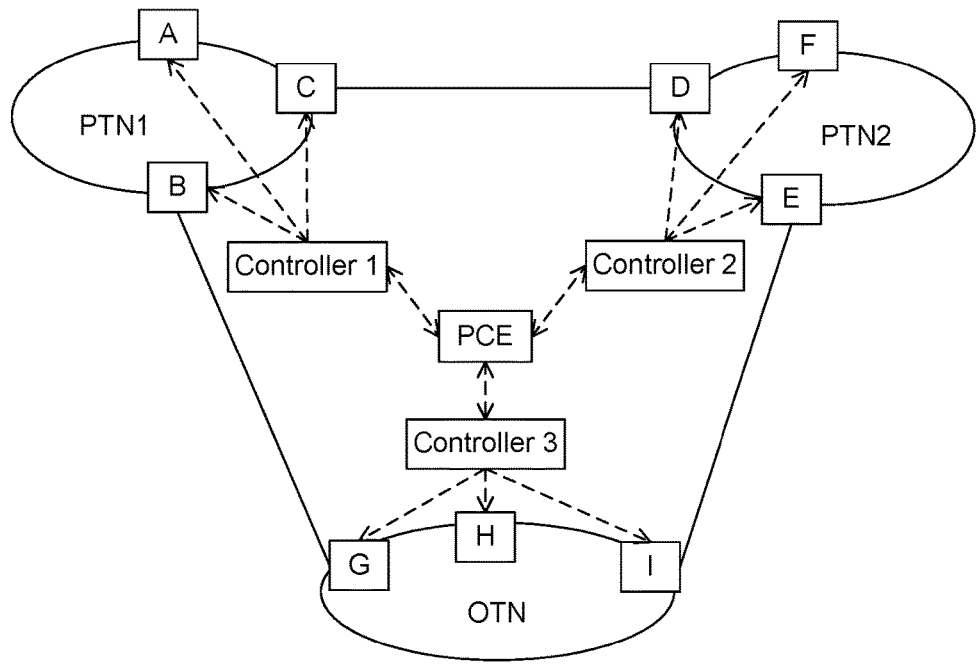
FIG. 8 is a schematic diagram of Path Calculate Element Protocol (PCEP) session initialization according to an embodiment of the disclosure.

A schematic diagram of a synchronization network crossing PTN and OTN domains of the embodiment is shown in FIG. 8. A clock synchronization implementation method of the embodiment including steps A1 to A5 is described as follows.

In A1, a controller exchanges an OPEN message with a PCE to confirm a supported clock synchronization type.

Figure 9:
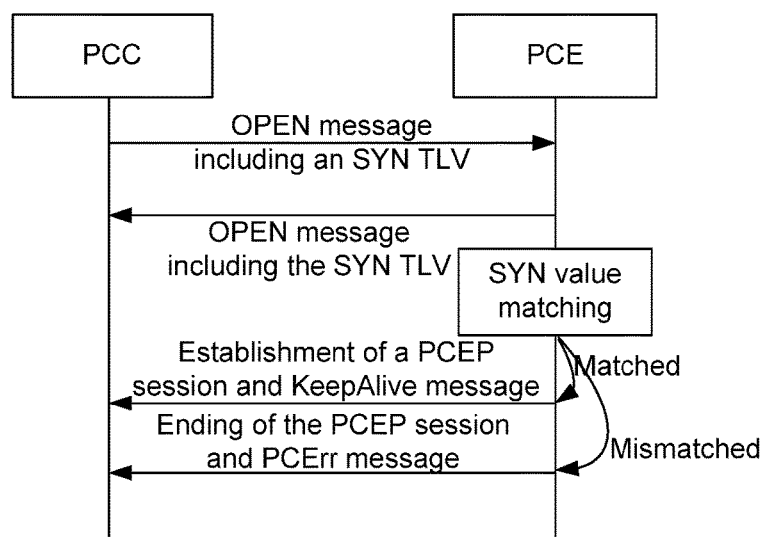
FIG. 9 is a schematic diagram of a synchronization network crossing PTN and OTN domains according to an embodiment of the disclosure.

Specifically, clock synchronization type information is carried through an SYN Type in an extended SYN TLV in the OPEN message. FIG. 9 is a schematic diagram of PCEP session initialization. When the PCE may calculate a clock synchronization type requested by a PCC, matching succeeds, a PCEP session is established, and a KeepAlive message is sent to keep the session; and when matching fails, a PCErr message is sent, and the PCEP session is ended. The specific process is shown in FIG. 9, and will not be elaborated herein.

In A2, the PCE acquires a physical topology of the synchronization network crossing PTN and OTN domains.

In A3, the PCE acquires synchronization information of each synchronization node and hop number information between the respective synchronization nodes.

Specifically, clock QL information, port priority information and hop number information of the nodes are acquired from PCReq messages sent to the PCE by controllers of a PTN1, a PTN2 and an OTN.

Figure 10:
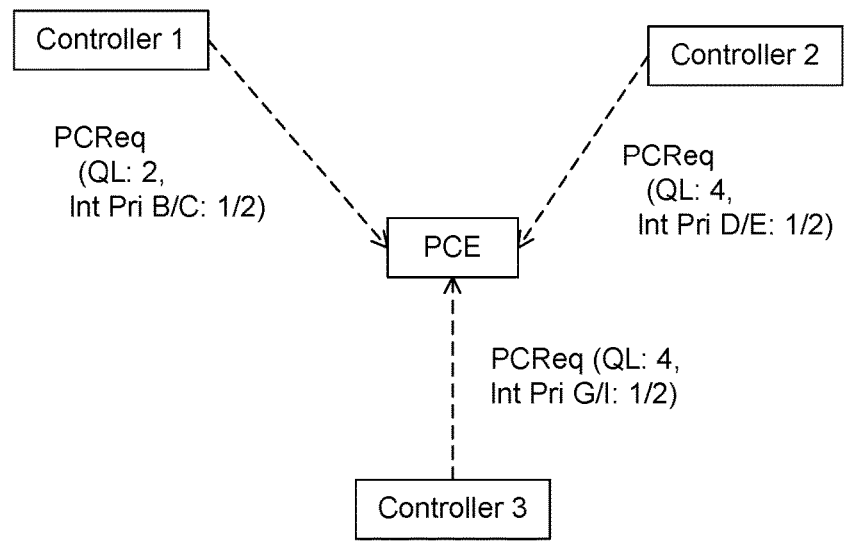
FIG. 10 is a schematic diagram of sending node synchronization information to a PCE by a controller according to an embodiment of the disclosure.

As shown in FIG. 10, the synchronization information, which may be received from a controller 1, a controller 2 and a controller 3 by the PCE respectively, of the PTN1, the PTN2 and the OTN is given as follows:

a QL of the PTN1 is 2 and priorities of a port B and a port C are 1 and 2 respectively;

a QL of the PTN2 is 4 and priorities of a port D and a port E are 1 and 2 respectively; and a QL of the OTN is 4 and priorities of a port G and a port I are 1 and 2 respectively.

The hop number information, acquired from a network management system by the PCE, between the respective cross-domain synchronization nodes is 1, that is, the nodes are all direct connection.

In A4, the PCE calculates a synchronization path (i.e. a clock synchronization path) of the cross-domain synchronization network according to physical topological information of the cross-domain synchronization network, the synchronization information and the hop number information.

Figure 11:
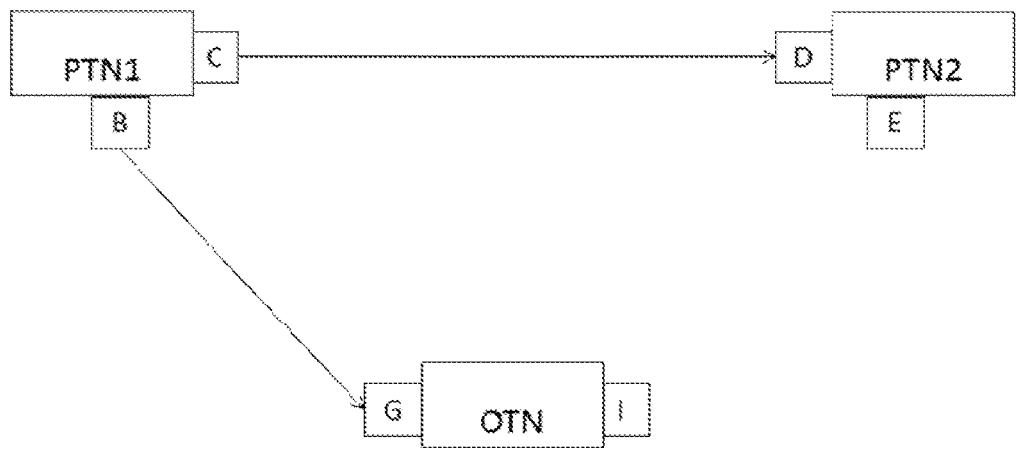
FIG. 11 is a schematic diagram of a synchronization path crossing PTN and OTN domains calculated by a PCE according to an embodiment of the disclosure.

Here, the PCE acquires the synchronization information of two nodes, and acquires the hop number information. Since the QL information of the node PTN1 is highest, the node PTN1 is preferably selected as output of clock synchronization, that is, a clock of the node PTN1 is synchronized to the node PTN2 and the node OTN. As shown in FIG. 11, the direction of each arrow represents the direction of the corresponding clock synchronization path.

In A5, the PCE sends a cross-domain synchronization path calculation result to each controller according to synchronization link topological information of the cross-domain synchronization network.

Figure 12:
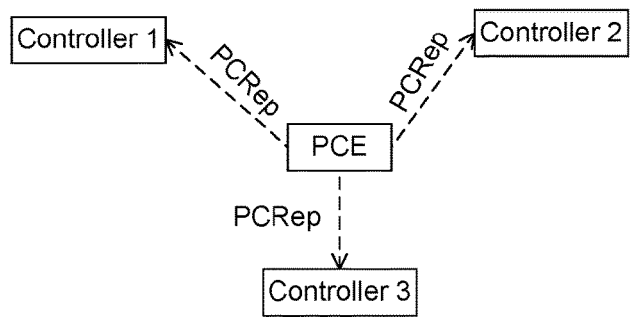
FIG. 12 is a schematic diagram of sending a synchronization path to a controller by a PCE according to an embodiment of the disclosure.

As shown in FIG. 12, the PCE sends the cross-domain synchronization path calculation result to the controller 1 of the PTN1, the controller 2 of the PTN2 and the controller 3 of the OTN.

In A6, each controller sends a clock synchronization instruction to synchronization nodes on the synchronization path according to the received calculation result.

Each controller sends the clock synchronization instruction to the synchronization nodes in the corresponding synchronization subnetworks where the controller is located according to the calculation result.

Second Embodiment

The embodiment is intended for a condition of non-direct connection and the domain sequence crossing PTN and OTN domains being unknown.

Figure 13:
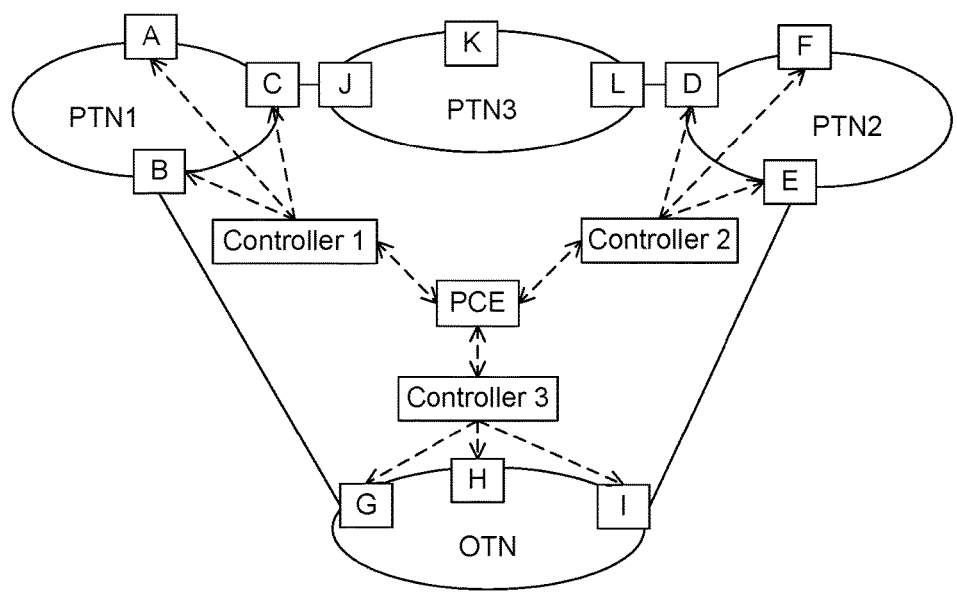
FIG. 13 is a schematic diagram of an non-direct connection synchronization network crossing PTN and OTN domains according to an embodiment of the disclosure.
Figure 14:
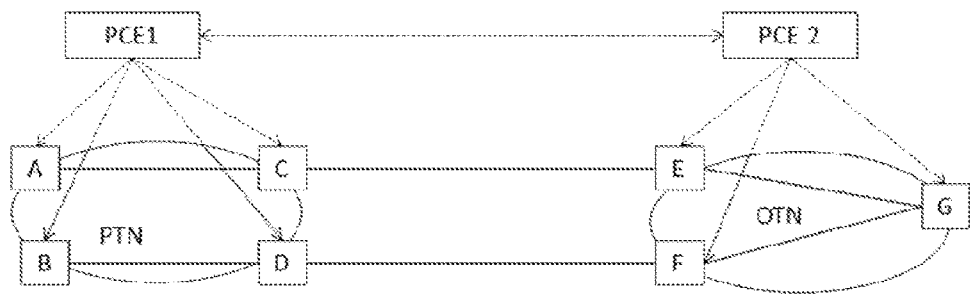
FIG. 14 is a schematic diagram of a synchronization network crossing PTN and OTN domains according to an embodiment of the disclosure.

FIG. 13 is a schematic diagram of a non-direct connection synchronization network crossing PTN and OTN domains according to an embodiment of the disclosure. A difference between the synchronization networks of the present embodiment and of the first embodiment is that: an inter-domain link between domain edge nodes of two cross-domain subnetworks (i.e. synchronization subnetworks) is a non-direct connection link, that is, there is another non-synchronization network between two adjacent domains which require clock synchronization.

A clock synchronization implementation method of the embodiment is described as follows.

A difference between the methods for the non-direct connection cross-domain synchronization network and the direct connection cross-domain synchronization network is that the step of acquiring hop number information between synchronization nodes by the PCE is different from each other, while the other steps are the same, that is, steps B1, B2 and B5 of the present embodiment are the same as steps A1, A2 and A5 of the first embodiment, and will not be elaborated herein. Steps B3 and B4 of the present embodiment which are different from those of embodiment 1 are described as follows.

In B3, the PCE acquires synchronization information of each synchronization node and the hop number information between the synchronization nodes.

Clock QL information, port priority information and hop number information of the nodes are acquired from PCReq messages sent to the PCE by controllers of a PTN1, a PTN2 and an OTN.

The synchronization information, which may be acquired from a controller 1, a controller 2, and a controller 3 by the PCE respectively, of the nodes PTN1, PTN2 and OTN is shown in FIG. 10, may refer to Step A3 of embodiment 1, and will not be elaborated herein.

The PCE acquires from a network management system that both the hop number between the direct connection cross-domain synchronization nodes PTN1 and OTN and the hop number between the direct connection cross-domain synchronization nodes PTN2 and the OTN are 1, and the hop number between the non-direct connection cross-domain synchronization nodes PTN1 and PTN2 is 3.

In B4, the PCE calculates a synchronization path of the cross-domain synchronization network according to physical topological information of the cross-domain synchronization network, the synchronization information and the hop number information.

The PCE calculates the cross-domain synchronization path of the cross-domain synchronization network according to the physical topological information of the synchronization network acquired in step B2 as well as the synchronization information of each node in the cross-domain synchronization network and hop number between the nodes, which are acquired from the controllers and the network management system in step B3.

Here, the PCE acquires the synchronization information of the three nodes, and acquires the hop number information. Since the QL information of the node PTN1 is highest, the node PTN1 is preferably selected as output of clock synchronization, that is, a clock of the node PTN1 is synchronized to the nodes PTN2 and the node OTN. As shown in FIG. 11, the direction of each arrow represents the direction of the corresponding clock synchronization path.

Third Embodiment

The embodiment is intended for a condition that a domain sequence crossing PTN and OTN domains is known.

A difference between the present embodiment and the first embodiment is that a sequence of domains through which a clock synchronization path in the embodiment is known to be PTN-OTN, and PCE 1 requests to calculate a cross-domain clock synchronization path between a PTN domain and an OTN domain.

A clock synchronization implementation method of the embodiment including steps C1 to C6 is described as follows.

In C1, A PCE of each domain exchanges an OPEN message to confirm a supported clock synchronization type.

Specifically, clock synchronization type information is carried through an SYN Type in an extended SYN TLV in the OPEN message. An OPEN message exchanging process between PCE1 and PCE2 is shown in FIG. 9, and will not be elaborated herein.

In C2, the PCE acquires a physical topology of a synchronization network crossing PTN and OTN domains.

In C3, the PCE acquires synchronization information of each synchronization node and hop number information between the synchronization nodes.

In the embodiment, the PCE acquires clock QL information of the synchronization nodes, and acquires the hop number information between the synchronization nodes from a network management system.

PCE 1 acquires QL information, i.e. 2, 4, 4 and 8 respectively, of synchronization nodes A, B, C and D, and hop number information 1 between the synchronization nodes.

PCE 2 acquires QL information, i.e. 4, 8 and 8 respectively, of synchronization nodes E, F and G, and hop number information 1 between the synchronization nodes.

In C4, the PCE calculates a synchronization path of the cross-domain synchronization network by adopting a BRPC method according to physical topological information of the synchronization network, the synchronization information and the hop number information.

In the cross-domain network shown in FIG. 15, PCE 1 sends a PCReq message to PCE 2 to request to calculate the clock synchronization path from the PTN to OTN domains.

PCE 2 calculates VSPT 1 at first according to physical topological information, acquired in step C2, of the synchronization network, as well as synchronization information of the synchronization nodes and hop number information between the synchronization nodes, which are acquired from a controller and the network management system in step C3. VSPT 1 includes a VSPT from each boundary node of the OTN domain to a destination node G: VSPT 1 includes two paths, E-G and F-G, and QLs of E and F are the same, i.e., 4. PCE 2 transmits VSPT 1 to PCE 1 through sub-objects in an extended ERO in FIG. 5 and FIG. 6.

PCE 1 calculates VSPT 2 according to VSPT 1, physical topological information, acquired in Step C2, of the synchronization network, as well as synchronization information of the synchronization nodes and hop number information between the synchronization nodes, which are acquired from a controller and the network management system in step C3. VSPT 2 includes a shortest path tree from each synchronization node of the PTN domain to the destination node G: VSPT 2 includes two paths: A-C-E-G and B-D-F-G. However, a QL of A is 2, a QL of B is 4, and PCE 1 selects the one with a higher QL as a clock source on the cross-domain clock synchronization path according to a priority principle, so that the cross-domain clock synchronization path finally obtained by PCE 1 is A-E-E-G, as shown in FIG. 16.

In C5, the PCE sends a cross-domain synchronization path calculation result to controllers in the PTN and OTN domains according to synchronization link topological information of the cross-domain synchronization network.

In C6, each controller sends a clock synchronization instruction to synchronization nodes on the synchronization path according to the calculation result.

Fourth Embodiment

The embodiment is intended for a clock synchronization updating condition of a cross-domain synchronization network.

When a synchronization node detects that a current clock source fails, or synchronization information of the synchronization node changes due to the fact of weakening of a clock signal of the current clock source and the like, or a physical topology of the cross-domain synchronization network changes, a controller is required to request a PCE to recalculate a cross-domain synchronization path, and sends updated synchronization information of the synchronization node to the PCE in a reinitiated calculation request, and the PCE also acquires a new physical topology of the cross-domain synchronization network, updates the previous synchronization path calculation result, and sends it to the controller for the controller to further send it to each synchronization node.

The controller re-establishes a PCEP session with the PCE, and sends the calculation request and the synchronization information of the synchronization node; the PCE acquires the physical topology of the synchronization network, calculates a cross-domain synchronization path with reference to the synchronization information of the synchronization node, and sends a calculation result to the controllers; and each controller sends a clock synchronization instruction to the synchronization nodes on the synchronization path according to the calculation result. The above process is the same as steps A1-A5 of the first embodiment, and will not be elaborated herein.

The disclosure provides an embodiment of a cross-domain clock synchronization system, which is applied to a cross-domain synchronization network. As shown in FIG. 17, the system includes a PCE 1701 and a controller 1702 participating in clock synchronization path calculation.

The PCE 1701 is arranged to: exchange a clock synchronization type with the controller 1702 to match the clock synchronization type supported by the PCE 1701 and the controller 1702, acquire physical topological information of the cross-domain synchronization network, acquire synchronization information of synchronization nodes of the cross-domain synchronization network and/or hop number information between the synchronization nodes, calculate a clock synchronization path of the cross-domain synchronization network according to the physical topological information as well as the synchronization information and/or the hop number information between the synchronization nodes, and send the clock synchronization path to the controller according to the physical topological information.

The controller 1702 is arranged to send a clock synchronization instruction to synchronization nodes on the clock synchronization path.

In an embodiment, the PCE 1701 is specifically arranged to exchange the clock synchronization type with the controller 1702 through an SYN Type in an extended SYN TLV in an OPEN message. Of course, during a practical application, the clock synchronization type may also be exchanged in another manner. There are no limits made here to a manner for exchanging clock synchronization type information.

In an embodiment, the PCE 1701 is specifically arranged to acquire the synchronization information from the controller through an added SYN-INFORMATION object in an extended PCReq message, or acquire the synchronization information through a network management system.

In an embodiment, the PCE 1701 is specifically arranged to send the clock synchronization path to the controller through an extended PCRep message according to the physical topological information.

Figure 18:
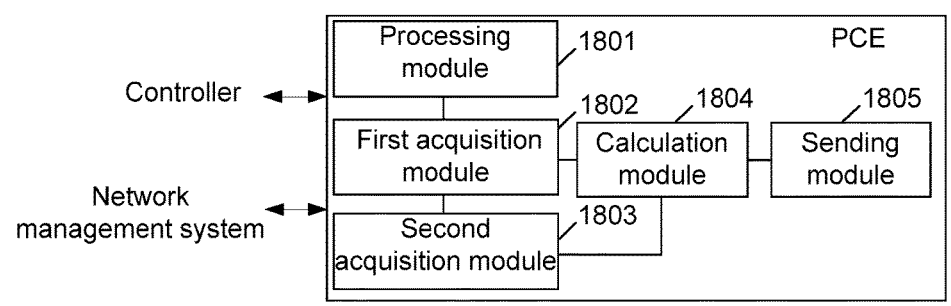
FIG. 18 is a structure diagram of an embodiment of a PCE according to the disclosure.

The disclosure provides an embodiment of a PCE, which is applied to a cross-domain synchronization network. As shown in FIG. 18, the PCE includes a processing module 1801, a first acquisition module 1802, a second acquisition module 1803, a calculation module 1804 and a sending module 1805.

The processing module 1801 is arranged to exchange a clock synchronization type with a controller participating in clock synchronization path calculation to match clock synchronization types supported by the PCE and the controller.

The first acquisition module 1802 is arranged to acquire physical topological information of the cross-domain synchronization network.

The second acquisition module 1803 is arranged to acquire synchronization information of synchronization nodes of the cross-domain synchronization network and/or hop number information between the synchronization nodes.

The calculation module 1804 is arranged to calculate a clock synchronization path of the cross-domain synchronization network according to the physical topological information as well as the synchronization information and/or the hop number information.

The sending module 1805 is arranged to send the clock synchronization path to the controller according to the physical topological information to enable the controller to send a clock synchronization instruction to synchronization nodes on the clock synchronization path.

In an embodiment, the processing module 1801 is specifically arranged to exchange the clock synchronization type with the controller participating in clock synchronization path calculation through an SYN Type in an extended SYN TLV in an OPEN message. Of course, In practical application, the clock synchronization type may also be exchanged in another manner. There are no limits made here to a manner for exchanging clock synchronization type information.

In an embodiment, the second acquisition module 1803 is specifically arranged to acquire the synchronization information from the controller through an added SYN-INFORMATION object in an extended PCReq message, or acquire, by the PCE, the synchronization information through a network management system.

In an embodiment, the sending module 1805 is specifically arranged to send the clock synchronization path to the controller through an extended PCRep message according to the physical topological information.

In practical application, the processing module 1801, the first acquisition module 1802 and the second acquisition module 1803 may be implemented through a Central Processing Unit (CPU), Micro Control Unit (MCU), Digital Signal Processor (DSP) or Field-Programmable Gate Array (FPGA) in the PCE in combination with a transceiver; the calculation module 1804 may be implemented through the CPU, MCU, DSP or FPGA in the PCE; and the sending module 1805 may be implemented through a transmitter in the PCE.

Figure 19:
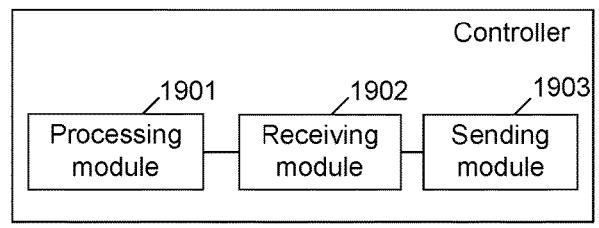
FIG. 19 is a structure diagram of an embodiment of a controller according to the disclosure.

The disclosure provides an embodiment of a controller, which is applied to a cross-domain synchronization network. As shown in FIG. 19, the controller includes a processing module 1901, a receiving module 1902 and a sending module 1903.

The processing module 1901 is arranged to exchange a clock synchronization type with a PCE to match clock synchronization types supported by the controller and the PCE.

The receiving module 1902 is arranged to receive a clock synchronization path sent by the PCE.

The sending module 1903 is arranged to send a clock synchronization instruction to synchronization nodes on the clock synchronization path.

In practical application, the processing module 1901 may be implemented through a CPU, MCU, DSP or FPGA in the controller in combination with a transceiver; the receiving module 1902 may be implemented through a receiver in the controller; and the sending module 1903 may be implemented through a transmitter in the controller.

From the above, according to the embodiments of the disclosure, a PCEP is extended, so that a PCE may be applied to a cross-domain synchronization network formed by multiple synchronization networks to calculate a clock synchronization path in a cross-domain hybrid networking scenario. The disclosure compensates shortcomings of current clock synchronization, and enhances a clock synchronization function.

Those skilled in the art should know that the embodiment of the disclosure may be provided as a method, a system or a computer program product. Therefore, the disclosure may adopt a form of hardware embodiment, software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

On such a basis, the disclosure provides an embodiment of a computer storage medium, which is applied to a cross-domain synchronization network, the computer storage medium includes a set of instructions, and the instructions are executed to cause at least one processor to execute the abovementioned cross-domain clock synchronization method.

The above are merely the preferred embodiments of the disclosure and not intended to limit the scope of protection of the disclosure.

What is claimed is:

1. A cross-domain clock synchronization method, applied to a cross-domain synchronization network, the method comprising:
   exchanging, by a Path Calculate Element (PCE), a clock synchronization type with a controller participating in clock synchronization path calculation, to match the clock synchronization type supported by the PCE and the controller;
   acquiring, by the PCE, physical topological information of the cross-domain synchronization network;
   acquiring, by the PCE, at least one of synchronization information of synchronization nodes of the cross-domain synchronization network or hop number information between the synchronization nodes;
   calculating, by the PCE, a clock synchronization path of the cross-domain synchronization network according to the physical topological information as well as at least one of the synchronization information or the hop number information; and
   sending, by the PCE, the clock synchronization path to the controller according to the physical topological information, to enable the controller to send a clock synchronization instruction to synchronization nodes on the clock synchronization path.

2. The method according to claim 1, wherein exchanging, by the PCE, the clock synchronization type with the controller participating in clock synchronization path calculation comprises:

exchanging, by the PCE, the clock synchronization type with the controller participating in clock synchronization path calculation through a synchronization type (SYN Type) in an extended SYN Type Length Value (TLV) in an open message.

3. The method according to claim 1, wherein acquiring, by the PCE, the physical topological information of the cross-domain synchronization network comprises:

acquiring, by the PCE, a physical topology of the cross-domain synchronization network through the controller or through a network management system.

4. The method according to claim 1, wherein acquiring, by the PCE, at least one of the synchronization information of the synchronization nodes of the cross-domain synchronization network or the hop number information between the synchronization nodes comprises:

acquiring, by the PCE, the synchronization information from the controller through an added synchronization-information (SYN-INFORMATION) object in an extended path calculate request (PCReq) message, or acquiring, by the PCE, the synchronization information through a network management system; and acquiring, by the PCE, the hop number information through the network management system.

5. The method according to claim 1, wherein calculating, by the PCE, the clock synchronization path of the cross-domain synchronization network according to the physical topological information as well as at least one of the synchronization information or the hop number information comprises:

when a sequence of synchronization subnetworks through which the clock synchronization path passes is known, calculating the clock synchronization path by adopting a Backward-Recursive PCE-Base Computation (BRPC) method.

6. The method according to claim 1, wherein calculating, by the PCE, the clock synchronization path of the cross-domain synchronization network according to the physical topological information as well as at least one of the synchronization information or the hop number information comprises:

when a sequence of synchronization subnetworks through which the clock synchronization path passes is unknown, calculating the clock synchronization path by adopting a Hierarchy-PCE (H-PCE) method.

7. The method according to claim 1, wherein the synchronization information comprises clock Quality Level (QL) information and port priority information; and wherein calculating, by the PCE, the clock synchronization path of the cross-domain synchronization network according to the physical topological information as well as at least one of the synchronization information or the hop number information comprises:

when only the clock QL information is acquired, selecting a node with a highest QL as a clock source output node; or, when only the port priority information is acquired, selecting a node with a higher-priority port as the clock source output node; or, when only the hop number information is acquired, selecting a node being a relatively smaller number of hops away from a current node as the clock source output node.

8. The method according to claim 1, wherein the synchronization information comprises clock Quality Level (QL) information and port priority information; and wherein calculating, by the PCE, the clock synchronization path of the cross-domain synchronization network according to the physical topological information as well as at least one of the synchronization information or the hop number information comprises:

when the clock QL information, the port priority information and the hop number information are acquired, preferably selecting a node with a highest QL as a clock source output node; when there are multiple nodes with the highest QL, selecting a node with a higher-priority port from nodes with the highest QL as the clock source output node; and when there are still multiple nodes with the higher-priority ports, selecting a node being a relatively smaller number of hops away from a current node from nodes with the higher-priority ports as the clock source output node.

9. The method according to claim 1, wherein sending, by the PCE, the clock synchronization path to the controller according to the physical topological information comprises:

sending, by the PCE, the clock synchronization path to the controller through an extended path calculate request (PCReq) message according to the physical topological information.

10. A Path Calculate Element (PCE), applied to a cross-domain synchronization network, the PCE comprising:

a processor; and a memory storing instructions executable by the processor, wherein the processor is arranged to:

exchange a clock synchronization type with a controller participating in clock synchronization path calculation to match the clock synchronization type supported by the PCE and the controller;

acquire physical topological information of the cross-domain synchronization network;

acquire at least one of synchronization information of synchronization nodes of the cross-domain synchronization network or hop number information between the synchronization nodes;

calculate a clock synchronization path of the cross-domain synchronization network according to the physical topological information as well as at least one of the synchronization information or the hop number information; and send the clock synchronization path to the controller according to the physical topological information to enable the controller to send a clock synchronization instruction to synchronization nodes on the clock synchronization path.

11. The PCE according to claim 10, wherein the processor is arranged to exchange the clock synchronization type with the controller participating in clock synchronization path calculation through a synchronization type (SYN Type) in an extended SYN Type Length Value (TLV) in an open message.

12. The PCE according to claim 10, wherein the processor is arranged to acquire the synchronization information from the controller through an added synchronization-information (SYN-INFORMATION) object in an extended path calculate request (PCReq) message, or acquire the synchronization information through a network management system.

13. The PCE according to claim 10, wherein the processor is arranged to send the clock synchronization path to the controller through an extended path calculate request (PCReq) message according to the physical topological information.

14. A non-transitory computer storage medium, comprising a set of instructions, which, when being executed, cause at least one processor to execute a cross-domain clock synchronization method, applied to a cross-domain synchronization network, the method comprising:
exchanging a clock synchronization type with a controller participating in clock synchronization path calculation, to match the clock synchronization type supported by a Path Calculate Element (PCE) and the controller;
acquiring physical topological information of the cross-domain synchronization network;
acquiring at least one of synchronization information of synchronization nodes of the cross-domain synchronization network or hop number information between the synchronization nodes;
calculating a clock synchronization path of the cross-domain synchronization network according to the physical topological information as well as at least one of the synchronization information or the hop number information; and
sending the clock synchronization path to the controller according to the physical topological information, to enable the controller to send a clock synchronization instruction to synchronization nodes on the clock synchronization path.

15. The non-transitory computer storage medium according to claim 14, wherein exchanging the clock synchronization type with the controller participating in clock synchronization path calculation comprises:
exchanging the clock synchronization type with the controller participating in clock synchronization path calculation through a synchronization type (SYN Type) in an extended SYN Type Length Value (TLV) in an open message.

16. The non-transitory computer storage medium according to claim 14, wherein acquiring the physical topological information of the cross-domain synchronization network comprises:
acquiring a physical topology of the cross-domain synchronization network through the controller or through a network management system.

17. The non-transitory computer storage medium according to claim 14, wherein acquiring at least one of the synchronization information of the synchronization nodes of the cross-domain synchronization network or the hop number information between the synchronization nodes comprises:

acquiring the synchronization information from the controller through an added synchronization-information (SYN-INFORMATION) object in an extended path calculate request (PCReq) message, or acquiring the synchronization information through a network management system; and
acquiring the hop number information through the network management system.

18. The non-transitory computer storage medium according to claim 14, wherein calculating the clock synchronization path of the cross-domain synchronization network according to the physical topological information as well as at least one of the synchronization information or the hop number information comprises:
when a sequence of synchronization subnetworks through which the clock synchronization path passes is known, calculating the clock synchronization path by adopting a Backward-Recursive PCE-Base Computation (BRPC) method.

19. The non-transitory computer storage medium according to claim 14, wherein calculating the clock synchronization path of the cross-domain synchronization network according to the physical topological information as well as at least one of the synchronization information or the hop number information comprises:
when a sequence of synchronization subnetworks through which the clock synchronization path passes is unknown, calculating the clock synchronization path by adopting a Hierarchy-PCE (H-PCE) method.

20. The non-transitory computer storage medium according to claim 14, wherein the synchronization information comprises clock Quality Level (QL) information and port priority information; and
wherein calculating the clock synchronization path of the cross-domain synchronization network according to the physical topological information as well as at least one of the synchronization information or the hop number information comprises:
when only the clock QL information is acquired, selecting a node with a highest QL as a clock source output node; or,
when only the port priority information is acquired, selecting a node with a higher-priority port as the clock source output node; or,
when only the hop number information is acquired, selecting a node being a relatively smaller number of hops away from a current node as the clock source output node.

* * * * *